United States Patent [19]
Nishida

[11] Patent Number: 5,710,662
[45] Date of Patent: Jan. 20, 1998

[54] AUTOMATIC FOCUS DETECTION DEVICE FOR MICROSCOPES

[75] Inventor: Hiroyuki Nishida, Hachioji, Japan

[73] Assignee: Olympus Optical Co., Ltd., Tokyo, Japan

[21] Appl. No.: 580,369

[22] Filed: Dec. 28, 1995

[30] Foreign Application Priority Data

Dec. 28, 1994 [JP] Japan .................. 6-326826

[51] Int. Cl.$^6$ .................. G02B 21/00; G02B 21/26; G01J 1/20; G01J 1/36
[52] U.S. Cl. .................. 359/368; 359/381; 359/382; 359/383; 359/384; 359/380; 250/201.3; 250/201.2; 250/204; 250/201.8
[58] Field of Search .................. 359/368, 381, 359/382, 383, 384, 380; 250/201.3, 201.2, 204, 201.8

[56] References Cited

U.S. PATENT DOCUMENTS

| | | | |
|---|---|---|---|
| 4,002,899 | 1/1977 | Stauffer | 250/209 |
| 4,311,904 | 1/1982 | Okada et al. | 250/204 |
| 4,639,587 | 1/1987 | Chadwick et al. | 359/383 |
| 4,935,612 | 6/1990 | Bierleutgeb | 250/201.2 |
| 5,079,582 | 1/1992 | Hamada et al. | 359/400 |
| 5,532,874 | 7/1996 | Stein | 359/368 |

FOREIGN PATENT DOCUMENTS

| | | | |
|---|---|---|---|
| 3735091 | 4/1988 | Germany | 359/383 |
| 63-98615 | 4/1988 | Japan | |
| 2-37313 | 2/1990 | Japan | |
| 190808 | 7/1990 | Japan | 359/383 |
| 403223806 | 10/1991 | Japan | 359/383 |

Primary Examiner—Paul M. Dzierzynski
Assistant Examiner—Mohammad Y. Sikder
Attorney, Agent, or Firm—Cushman, Darby & Cushman IP Group of Pillsbury, Madison & Sutro LLP

[57] ABSTRACT

An automatic focus detection device for microscopes includes an optical system for forming an image of a sample; an image sensor for photoelectrically converting an optical image derived from the optical system; a device for storing image data such that an electric signal obtained from the image sensor is converted from analog to digital form and for processing the image data to compute contrast values; a device for comparing the contrast values; a device for moving an objective lens or a stage for the sample; and a device for storing the position of the objective lens or the stage. In this case, an image contrast at a present position is compared with a contrast at the position where an objective lens or the sample is moved along the optical axis by a predetermined distance, a distance required for movement of the objective lens or the stage is determined from this comparison, and if the distance of movement and a contrast change by the comparison are below constant values, a corresponding position will be decided as the position of the focal plane.

7 Claims, 9 Drawing Sheets

AUTOMATIC FOCUS DETECTION DEVICE FOR MICROSCOPES

BACKGROUND OF THE INVENTION

1. Field of the Invention

This invention relates to an automatic focus detection device for microscopes, such as phase-contrast microscopes, having illumination systems with annular apertures.

2. Description of Related Art

FIG. 1 shows the arrangement of an optical system provided in a common phase-contrast microscope of the prior art. This optical system includes an annular aperture 1 for determining the numerical aperture of illumination light introduced from an illumination system with an annular aperture, not shown, into a condenser lens 2; a stage 3 for placing an observation sample illuminated by the light from the condenser lens 2; an objective lens 4; and a phase plate 5.

Examples of conventional automatic focus detection techniques for measuring a position where a contrast is maximized, as the position of focal plane, by using the above optical system are disclosed in Japanese Patent Preliminary Publication Nos. Hei 2-37313 and Sho 63-98615.

The automatic focus detection technique set forth in Hei 2-37313 is such that a stage on which an object is placed is moved by a predetermined constant distance within the limit of a predetermined number of times, contrast and position data at each shifted position of the stage are detected and stored, the relationship between them is found from a curvilinear approximation, and the focal position is computed in accordance with this curve and thus is detected.

On the other hand, the automatic focus adjustment technique described in Sho 63-98615 is such that an objective lens or an object is moved along the optical axis by a constant step from a basic point to measure and store a contrast at its shifted position and to compare the difference between the contrast after the movement and a contrast stored in the past at the shifted position with a preset decision value so that if all of these comparison results have positive values (a contrast is decreased) and all of comparison results of plural positions corresponding to a predetermined number of times of measurement have positive values, it is decided that the position of the maximum contrast has been passed in view of the operation of the step movement.

The techniques for focus detection mentioned above are sometimes used in microscopes, such as phase-contrast microscopes, having illumination systems with annular apertures.

In the phase-contrast microscope, the defocus characteristics of an image contrast are such that the contrast is maximized at the position of the focal plane and is decreased with increasing defocus, but if defocusing is further performed, the contrast will be increased again. This is attributable to illumination due to the annular aperture.

The technique of Hei 2-37313 is effective only when a contrast having only one extremum (maximum) occurs with respect to the movement of the stage, and provides a considerable quick response time. In the case where at least two maxima are produced, however, this technique has the possibility of computing the position of a secondary maximum, not a principal maximum, as a solution (the position of the focal plane), and fails to provide means for obviating this problem. Consequently, it cannot be used in the case where at least two maxima occur, and therefore, in the phase-contrast microscope.

On the other hand, the technique of Sho 63-98615 can find a real principal maximum even though the contrast has two or more maxima, and thus can be used in the phase-contrast microscope. This technique, however, has the defect that much time is required for computation, because after one maximum has been found, the contrast is further measured while moving the objective lens or the object at a constant rate and maxima are found for a predetermined number of times.

The technique set forth in this prior art article, which is to scan the entire area in a specified range, is hereinafter referred to as a point-by-point measuring method, while the technique of Hei 2-37313, which does not completely perform the scanning, is called a non-point-by-point measuring method.

SUMMARY OF THE INVENTION

It is, therefore, an object of the present invention to provide an automatic focus detection device for microscopes, such as phase-contrast microscopes, having illumination systems with annular apertures, which can detect the position of the principal maximum of a contrast with accuracy even with the non-point-by-point measuring method.

In order to achieve this object, the automatic focus detection device for microscopes according to the present invention includes an optical system for forming an image of a sample to be observed; an image sensor for photoelectrically converting an optical image derived from the optical system; means for storing image data that an electric signal obtained from the image sensor is converted from analog to digital and for processing the image data to compute contrast values; means for comparing the contrast values; means for moving an objective lens or a sample stage included in the optical system; and means for storing the position of the objective lens or the sample stage. In this case, an image contrast at a present position is compared with a contrast at the position where an objective lens included in the optical system or the sample stage is moved along the optical axis by a predetermined distance, a distance required for movement of the objective lens or the sample stage is determined from a contrast change by comparison, and if the distance required for movement and the contrast change are below constant values, a corresponding position is decided as the position of a focal plane. Further, in the detection device of the present invention, a microscope optical system having an illumination system with an annular aperture for forming the image of the sample is provided, and a distance between the objective lens and the sample is changed by the same space as a distance between the position of the focal plane and a false position of the focal plane found by the distance decided as the position of the focal plane, ratios of two numerical apertures determined by the inside and outside diameters of a conjugate image with an objective pupil of the illumination system with an annular aperture to the numerical aperture of the objective lens, and one frequency determined by the size of the image sensor or an integral multiple thereof, so that a contrast measurement is made in at least one place between the position of the focal plane and the false position of the focal plane, and the position of the focal plane is detected by comparison with a measured contrast value.

Still further, the automatic focus detection device of the present invention in the above construction is designed so that the contrast measurement is made in at least one place between the focal and false focal points by at least two frequencies.

DETAILED DESCRIPTION OF THE PREFERRED EMBODIMENTS

Figure 1:
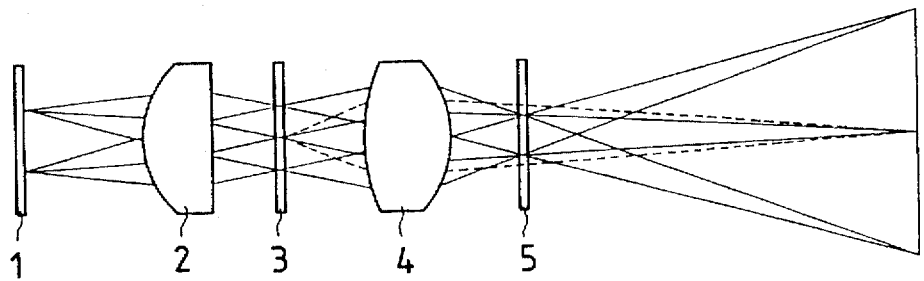
FIG. 1 is a sectional view showing the arrangement of an optical system, developed along the optical axis, of a common phase-contrast microscope of the prior art.

Before undertaking the explanation of the embodiments, it will be expedient to describe the function of the automatic focus detection device for microscopes according to the present invention. In the construction of the present invention, a distance d between the position of the focal plane and the false position of the focal plane is found as follows:

The pupil of the illumination system is nearly conjugate with that of the imaging system, and a complex amplitude distribution S(x, y) of a nearly conjugate image of the pupil of the illumination system is given by $$S(x,y) = \begin{cases} 0 & (0 \leq \sqrt{x^2+y^2} < NA_1/NA_{OB}) \\ 1 & (NA_1/NA_{OB} \leq \sqrt{x^2+y^2} < NA_0/NA_{OB}) \\ 0 & (NA_0/NA_{OB} \leq \sqrt{x^2+y^2} \leq 1) \end{cases} \quad (1)$$

where x and y are the coordinates in the pupil plane of the illumination system, $NA_1$ is the numerical aperture of illumination determined by the inside of the annular aperture, $NA_0$ is the numerical aperture of illumination determined by the outside of the annular aperture, and $NA_{OB}$ is the numerical aperture of the objective lens.

On time other hand, a complex amplitude distribution P(x, y) of the pupil or the imaging system is expressed by $$P(x,y) = \begin{cases} \exp\left[i \cdot \frac{2\pi}{\lambda} \cdot W_{DEF}(x,y)\right] \\ (0 \leq \sqrt{x^2+y^2} < NA_1/NA_{OB}) \\ t\exp\left[i\frac{\pi}{2}\right] \cdot \exp\left[i \cdot \frac{2\pi}{\lambda} \cdot W_{DEF}(x,y)\right] \\ (NA_1/NA_{OB} \leq \sqrt{x^2+y^2} < NA_0/NA_{OB}) \\ \exp\left[i \cdot \frac{2\pi}{\lambda} \cdot W_{DEF}(x,y)\right] \\ (NA_0/NA_{OB} \leq \sqrt{x^2+y^2} \leq 1) \end{cases} \quad (2)$$

where $\lambda$ is a wavelength, t is the amplitude transmittance of a phase film, $W_{DEF}$ (x, y) is a wave aberration caused by defocus. When the amount of defocus from the position of the focal plane is represented by z, $W_{DEF}$ (x, y) is expressed by $$W_{DEF}(x, y) = \tfrac{1}{2}(NA_{OB})^2 \cdot z \cdot (x^2+y^2) \quad (3)$$

From the above equations, a modulation transfer function (MTF, image contrast) $I(\xi, \eta)$ or the optical system becomes $$I(\epsilon,\eta) \propto \int\int_{-\infty}^{\infty} S(x,y) \cdot P(x-\epsilon, y-\eta) dx dy \quad (4)$$

However, since time MTF $I(\xi, \eta)$ is axially symmetric, $\eta=0$ and only the direction of $\xi$ may be considered.

Also, $\xi$ and a frequency $\nu$ have the relation:

$$\epsilon = \frac{\lambda}{NA_{OB}} \nu \quad (5)$$

Figure 2:
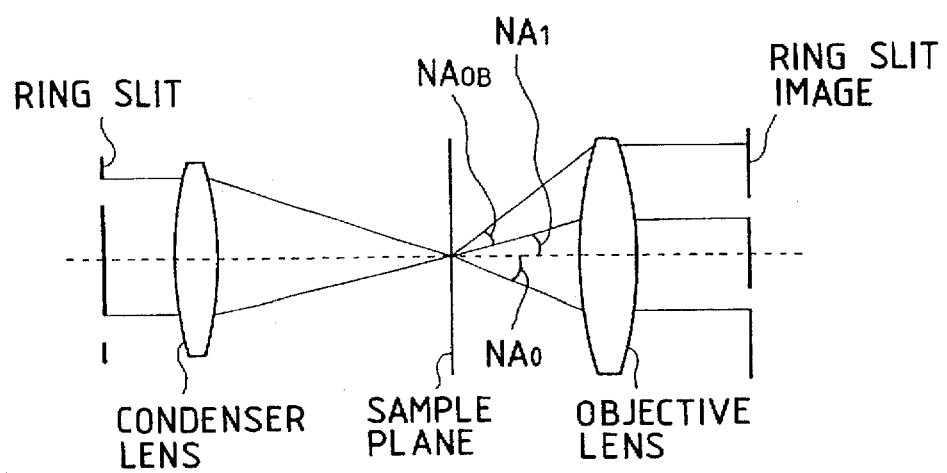
FIG. 2 is a view showing a case where the numerical aperture of an illumination system with an annular aperture is determined.
Figure 3:
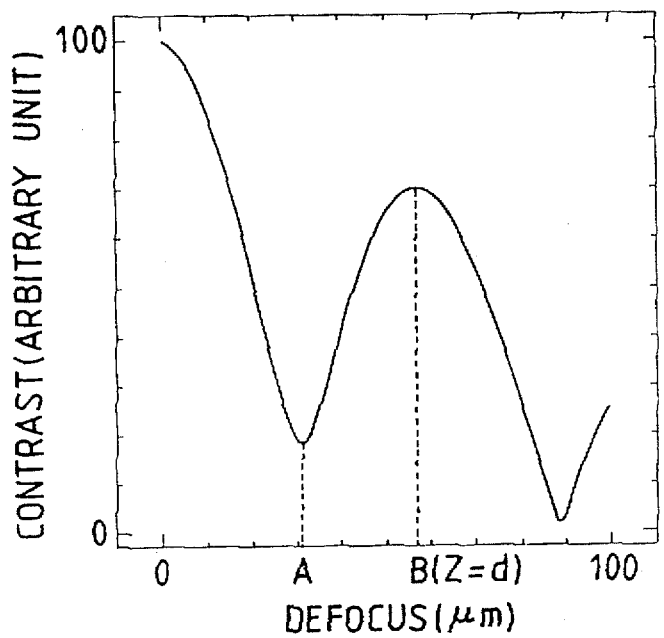
FIG. 3 is a graph showing defocus characteristics of a contrast in a microscope optical system having the illumination system with an annular aperture.

FIG. 2 shows the case where numerical apertures of the illumination system with an annular aperture and the objective lens are determined. It is now assumed that $\nu 0$ denotes one frequency determined by the size of the image sensor or an integral multiple thereof and is fixed as $\nu=\nu 0$. When the defocus distance z is taken as the abscissa and the contrast I as the ordinate, a graph shown in FIG. 3 is plotted (however, the effect of the amplitude transmittance t on the false position of the focal plane is negligible, and thus the computation is performed as t=1). The contrast I against the amount of defocus z from the position of the focal plane decreases at first, but after being minimized at point A, it increases again and reaches a maximum at point B (z=d). This position corresponds to the false position of the focal plane. Thus, by finding the value of d, the distance between the position of the focal plane and the false position of the focal plane can be obtained. Since this procedure does not depend on the sample, it is possible to know beforehand about the distance between the position of the focal plane and the false position of the focal plane from a theoretical calculation. Even though the position of the focal plane determined by the non-point-by-point measuring method is false, the position where the distance between the objective lens and the sample is increased or reduced by the same space as the distance between the position of the focal plane and the false position of the focal plane is the position of the focal plane. Therefore, even when the contrast measurement is made by the conventional non-point-by-point measuring method, it merely shows a slight increase of the number of measuring points of contrast signals, and thus it is possible to find an accurate position of the focal plane.

As one of specific means for realizing the above description, if the relations of a contrast C0 at a temporary position of the focal plane secured by the non-point-by-point measuring method, a contrast C+ at the position where the distance between the objective lens and the sample is increased by the same space as the distance between the position of the focal plane and the false position of the focal plane from the temporary position, and a contrast C– at the position where it is reduced are C0–C+>0 and C0–C–>0, the position where the contrast C0 is measured is decided as the position of the focal plane, and the stage or the objective lens is moved to this position. If C0–C+<0, the position where the contrast C+ is measured is decided as the position of the focal plane, and the stage or the objective lens is moved to this position. Further, if C0–C–<0, it is only necessary that the position where the contrast C– is measured is decided as the position of the focal plane, and the stage or the objective lens is moved to this position.

For the criterion of the position of the focal plane, in the case where C0–C+>0 and C0–C–>0, the contrast is maximized at the position where the contrast C0 is measured, and therefore it is only necessary to decide this position as the position of the focal plane. Where C0–C+<0, the contrast is maximized at the position where the contrast C+ is measured, and therefore it is only necessary to decide this position as the position of the focal plane. Further, where C0–C–<0, the contrast is maximized at the position where the contrast C– is measured, and thus it is only necessary to decide this position as the position of the focal plane.

Besides the construction mentioned above, it is desirable that the detection device of the present invention is designed so that the position of the focal plane found at first is determined as an initial position and the automatic detection of the position of the focal plane is repeatedly performed. This is because aberrations are produced in an actual optical system and there is the possibility that defocus characteristics of the contrast deviate from an ideal curve. As such, the detection of the position of the focal plane is performed, not only once but also several times by feedback, and thereby focus detection can be done with high accuracy.

Moreover, the automatic focus detection device of the present invention may be constructed as follows: In the relations of the contrast C0 with the frequency ν0 at the position decided as the temporary position of the focal plane, a contrast C2 at the position where the distance between the objective lens and the sample is increased or reduced by the same space as the distance between the position of the focal plane and the false position of the focal plane from the temporary position, and a threshold value Δ, if C2–Δ<0, a symmetrical position of the position where the contrast C2 is measured with respect to the position where the contrast C0 is measured is decided as the position of the focal plane, and the stage or the objective lens is moved to this position. If C2–Δ>0 and C0–C2<0, the position where the contrast C2 is measured is decided as the position of the focal plane, and the stage or the objective lens is moved to this position. Further, if C2–Δ>0 and C0–C2>0, the position where the contrast C0 is measured is decided as the position of the focal plane, and the stage or the objective lens is moved to this position.

For the criterion in this case, when C2–Δ<0, the position where the contrast C0 is measured is the false position of the focal plane, and thus it is only necessary that a symmetrical position of the position where the contrast C2 is measured with respect to the position where the contrast C0 is measured is decided as the position of the focal plane. On the other hand, when C2–Δ>0 and C0–C2<0, the contrast at the position where the contrast C2 is measured is maximized, and thus it is only necessary to decide this position as the position of the focal plane. Further, when C2–Δ>0 and C0–C2>0, the contrast at the position where the contrast C0 is measured is maximized, and thus it is only necessary to decide this position as the position of the focal plane.

For the defocus characteristics of the contrast signal relative to the frequency ν0, if a frequency ν1 is chosen so that the position of a secondary maximum at the frequency ν0 coincides with that of a secondary minimum at the frequency ν1, the contrast, even though the frequency is changed, will not be considerably decreased in the case where the position of the focal plane secured by the non-point-by-point measuring method with the frequency ν0 is real. When it is false, however, it is possible that the contrast is considerably reduced. The frequency depends on a pixel size of a detector and is varied by regarding several pixel pieces as one pixel to change an apparent size. Since the choice of the frequency ν1 in this case also does not depend on the sample, a combination with the distance between the position of the focal plane and the false position of the focal plane makes it possible to detect the position of the focal plane with accuracy, merely showing a slight increase of the number of measuring points of contrast signals compared with the conventional non-point-by-point measuring method.

As one of specific means for realizing the above description, if the relations of the contrast C0 with the frequency ν0, a contrast C1 with the frequency ν1, the contrast C2 at the position where the distance between the objective lens and the sample is increased or reduced by the same space as the distance between the position of the focal plane and the false position of the focal plane determined by two numerical apertures determined by the inside and outside diameters of the annular aperture of the illumination system and the frequency, from the temporary position found from the detection device, and the threshold value Δ are C1–C2>0, the position where the contrast C0 is measured is decided as the position of the focal plane, and the stage or the objective lens is moved to this position. If C0–C2=0, the position where the contrast C2 is measured is decided as the position of the focal plane, and the stage or the objective lens is moved to this position. Further, if C0–C2>0, a symmetrical position of the position where the contrast C2 is measured with respect to the position where the contrast C0 is measured is decided as the position of the focal plane, and the stage or the objective lens is moved to this position.

For the criterion in this case, when C1–Δ>0, the contrast is produced even though the frequency is changed, and thus the position where the contrast C0 is measured is decided as the position of the focal plane. Even though the position of the focal plane detected by the non-point-by-point measuring method is false, the contrast is improved in the case of C0–C2<0, and therefore it is only necessary that the position where the contrast C2 is measured is decided as the position of the focal plane. On the other hand, in the case of C0–C2>0, the position where the contrast C2 is measured is not the position of the focal plane, and thus a symmetrical position of this position with respect to the temporary position of the focal plane is decided as the position of the focal plane.

Since, as mentioned above, the detection device of the present invention is constructed so that the position of the focal plane found at first is set to an initial condition and can be repeatedly detected, a more accurate focal position can be detected.

In accordance with the embodiments shown, the present invention will be described in detail below.

First embodiment

Figure 4:
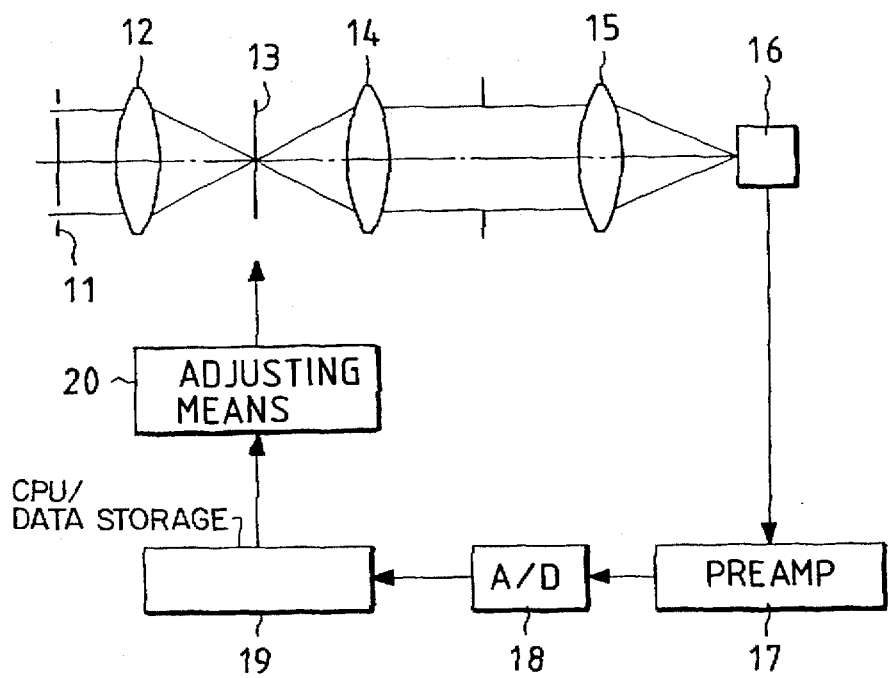
FIG. 4 is a view showing the arrangement of the automatic focus detection device of a first embodiment in the present invention.

In FIG. 4, the detection device of this embodiment includes an annular aperture 11 for determining the numerical aperture of illumination light introduced from a illumination system with an annular aperture, not shown, into a condenser lens 12; a stage 13 for placing an observation sample illuminated by the light from the condenser lens 12; an objective lens 14 and an imaging lens 15 for introducing an image of the sample into an image sensor 16; a preamplifier 17 for amplifying the voltage of an electric signal fed from the image sensor 16; an A/D converter 18 for converting the signal from the preamplifier 17 from analog to digital and introducing the signal into a CPU/DATA STORAGE 19; and an adjusting means 20 for moving the stage 13 in response to a signal produced by the CPU 19.

The first embodiment is set to NA0/NA0B=0.54, NA1/NA0B=0.44, and the frequency v0=72.7 lines/mm (using a 10× objective lens and sampling 12 pixels, each of 5.7 µm). The defocus characteristics of the contrast are plotted in the graph of FIG. 5. In this figure, the abscissa is the defocus distance and the ordinate is the contrast signal value (arbitrary unit). It is seen from this graph that the distance d between the position of the focal plane and the false position of the focal plane should be set at 57 µm. Since the focal depth is a few micrometers, the value of the distance d need not be precisely defined.

In the first embodiment, the contrast C0 at the temporary position of the focal plane is first measured by the non-point-by-point measuring method. This measuring result is brought about in such a way that, in FIG. 4, the sample image received by the image sensor 16 is converted into an electric signal, which is introduced through the preamplifier 17 and the A/D converter 18 into the CPU/DATA STORAGE 19, and a predetermined calculation is performed in the CPU/DATA STORAGE 19. Subsequently, the stage 13 is moved, by the adjusting means 20, to the position where the distance between the objective lens and the sample is increased by the same space as the distance between the position of the focal plane and the false position of the focal plane, and the contrast C+ is measured in the same way. Further, by the adjusting means 20, the stage 13 is moved to the position where the distance between the objective lens and the sample is reduced by the same space as the distance between the position of the focal plane and the false position of the focal plane, and the contrast C− is measured. The contrast values C0, C+, and C− are compared with one another in the CPU/DATA STORAGE 19, and if C0−C+>0 and C0−C−>0, the stage 13 is moved by the adjusting means 20 to the position where the contrast C0 is measured. If, on the other hand, this condition is not fulfiled and C0−C+<0, the stage 13 is moved by the adjusting means 20 to the position where the contrast C+ is measured. Further, if the latter condition is also not fulfiled and C0−C−<0, the stage 13 is moved by the adjusting means 20 to the position where the contrast C− is measured. By such procedure, an accurate position of the focal plane can be decided.

Figure 6:
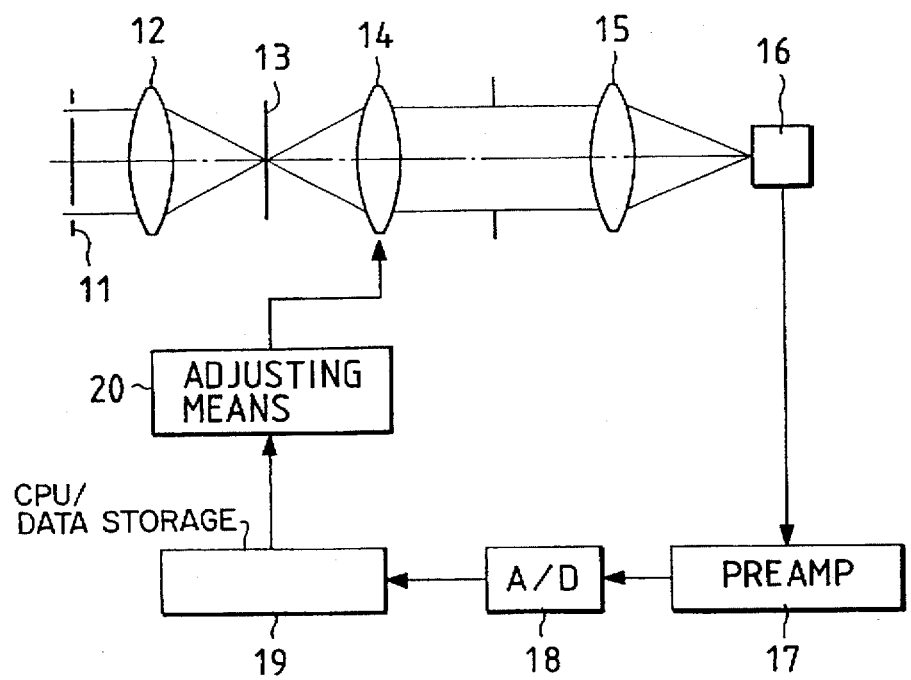
FIG. 6 is a view showing the arrangement of another example of the detecting device of the first embodiment.

In FIG. 4, even where an arrangement is made so that the objective lens 14, instead of the stage 13, is moved by the adjusting means 20, the same effect can be brought about (refer to FIG. 6).

Figure 7:
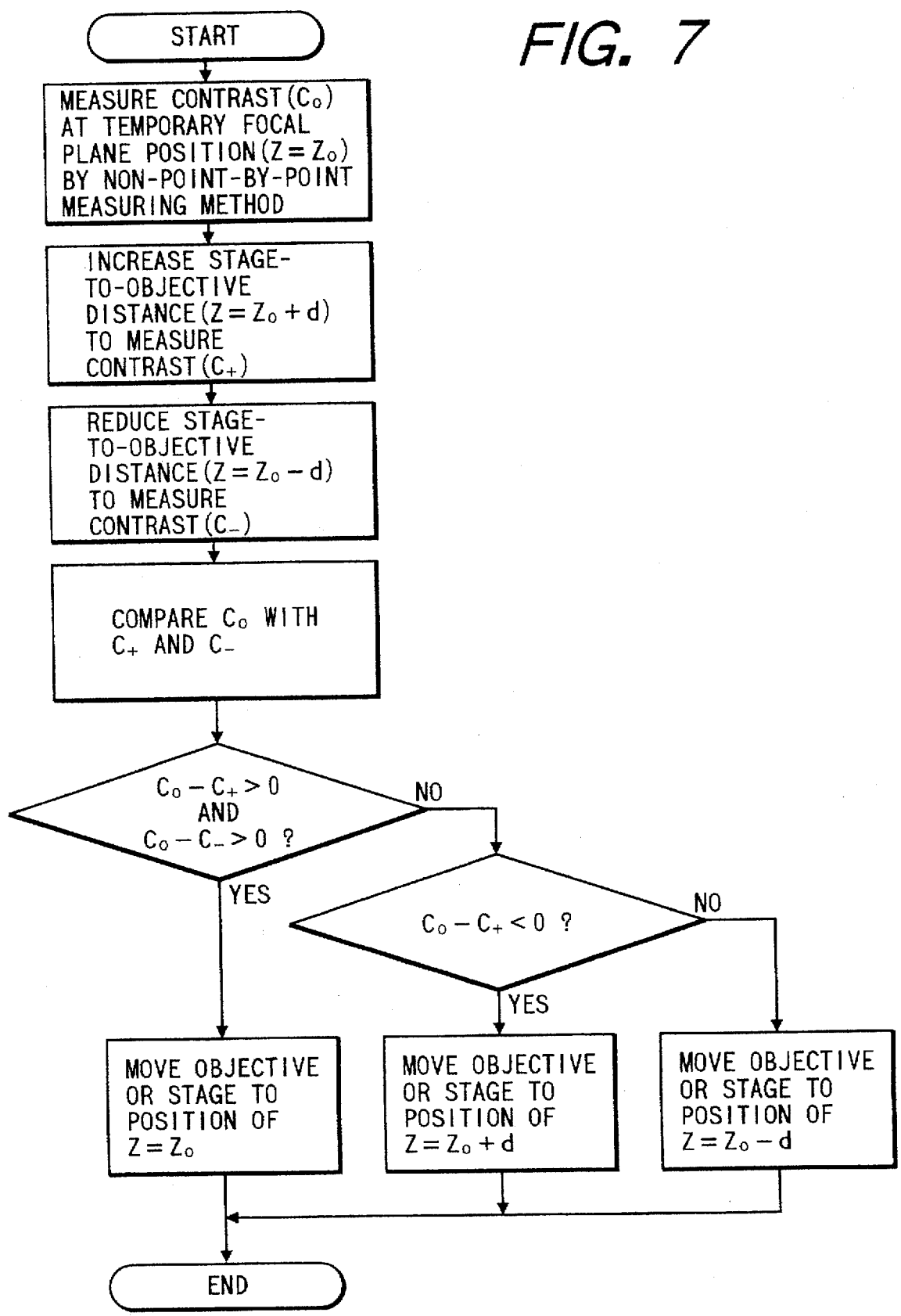
FIG. 7 is a flowchart showing the procedure of operation of the detection device of the first embodiment.

FIG. 7 shows a flowchart for explaining the operation of the detection device of the first embodiment.

Second embodiment

The construction of the detection device according to this embodiment is the same as that of the first embodiment. However, the second embodiment is set to NA0/NA0B=0.54, NA1/NA0B=0.44, and the frequency v0=43.6 lines/mm (using a 10× objective lens and sampling 20 pixels, each of 5.7 µm). The defocus characteristics of the contrast are plotted in the graph of FIG. 8. Thus, the distance d between the position of the focal plane and the false position of the focal plane is 92 µm. Also, the operation of the detection device in the second embodiment, identical with that in the first embodiment, is omitted.

Third embodiment

The automatic focus detection device according to this embodiment has the same construction as that of the first embodiment, and the numerical apertures and frequencies also are identical with those in the first embodiment.

In the third embodiment, if the relations of the contrast C0 with the frequency v0 at the position decided as the temporary position of the focal plane, the contrast C2 at the position where the distance between the objective lens and the sample is increased or reduced by the same space as the distance between the position of the focal plane and the false position of the focal plane, and the threshold value $\Delta$ are C2−$\Delta$<0, a position which forms symmetry with the position where the contrast $C_2$ is measured with respect to the position where the contrast C0 is measured is decided as the position of the focal plane, and the stage or the objective lens is moved to this position. This is because the position where the contrast $C_0$ is measured is the false position. If this condition is not satisfied, the contrast C2 is compared with the contrast C0. As a result, if C2−$\Delta$<0 and C0−C2<0, the stage or the objective lens is moved to the position where the contrast C2 is measured. Further, if one of these conditions is not satisfied, it is only necessary that the position where the contrast C0 is measured is decided as the position of the focal plane.

Figure 9:
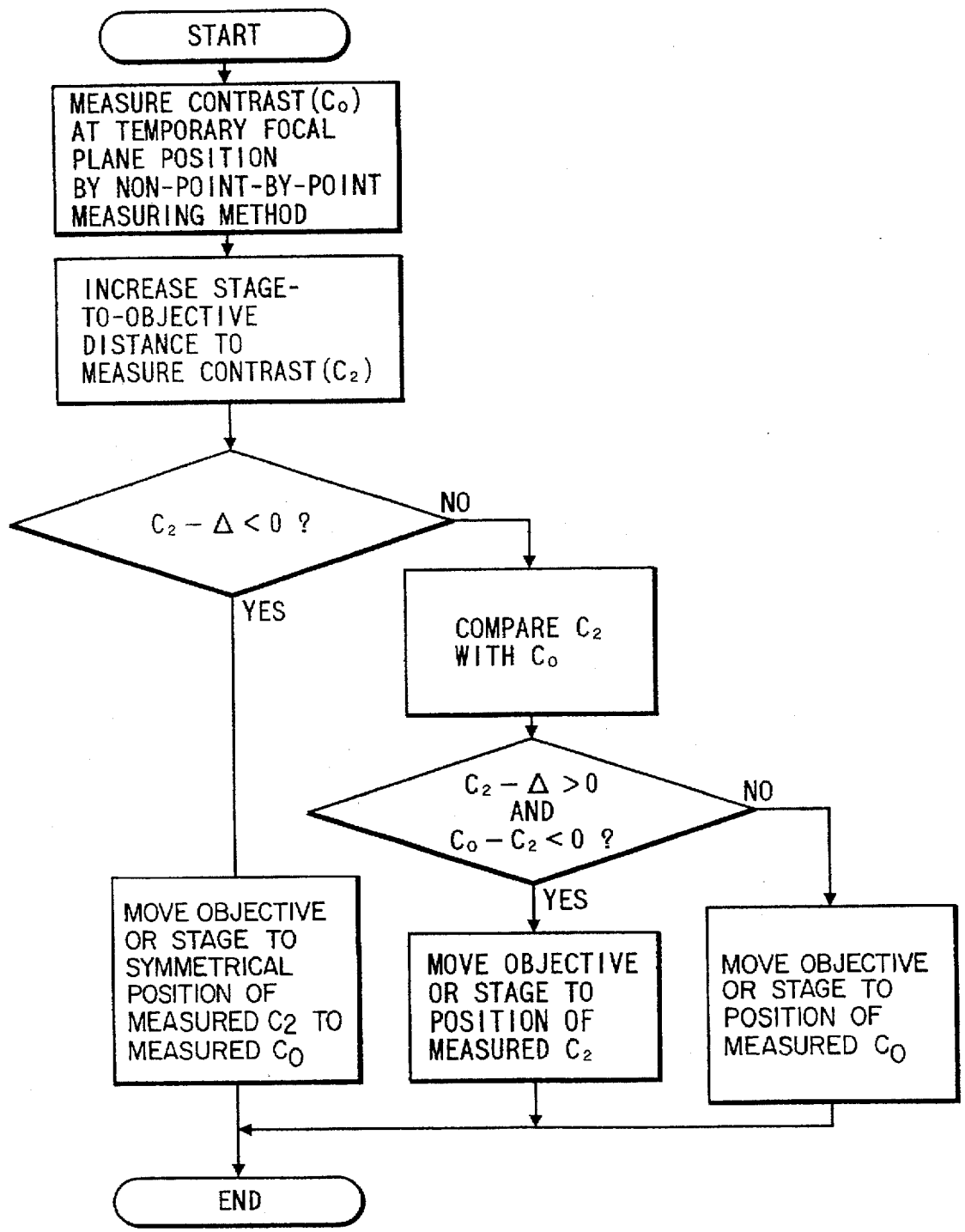
FIG. 9 is a flowchart showing the procedure of operation of the detection device of a third embodiment in the present invention.

The operation procedure of the above description is shown in FIG. 9.

Fourth embodiment

The automatic focus detection device according to this embodiment has the same construction as that of the first embodiment, and the numerical apertures and frequencies also are identical with those in the first embodiment. In the operation procedure of the device, however, the position of the focal plane first detected is set as the initial position and feedback is operated. That is, a feedback system is added to the operation procedure of the first embodiment.

Figure 10:
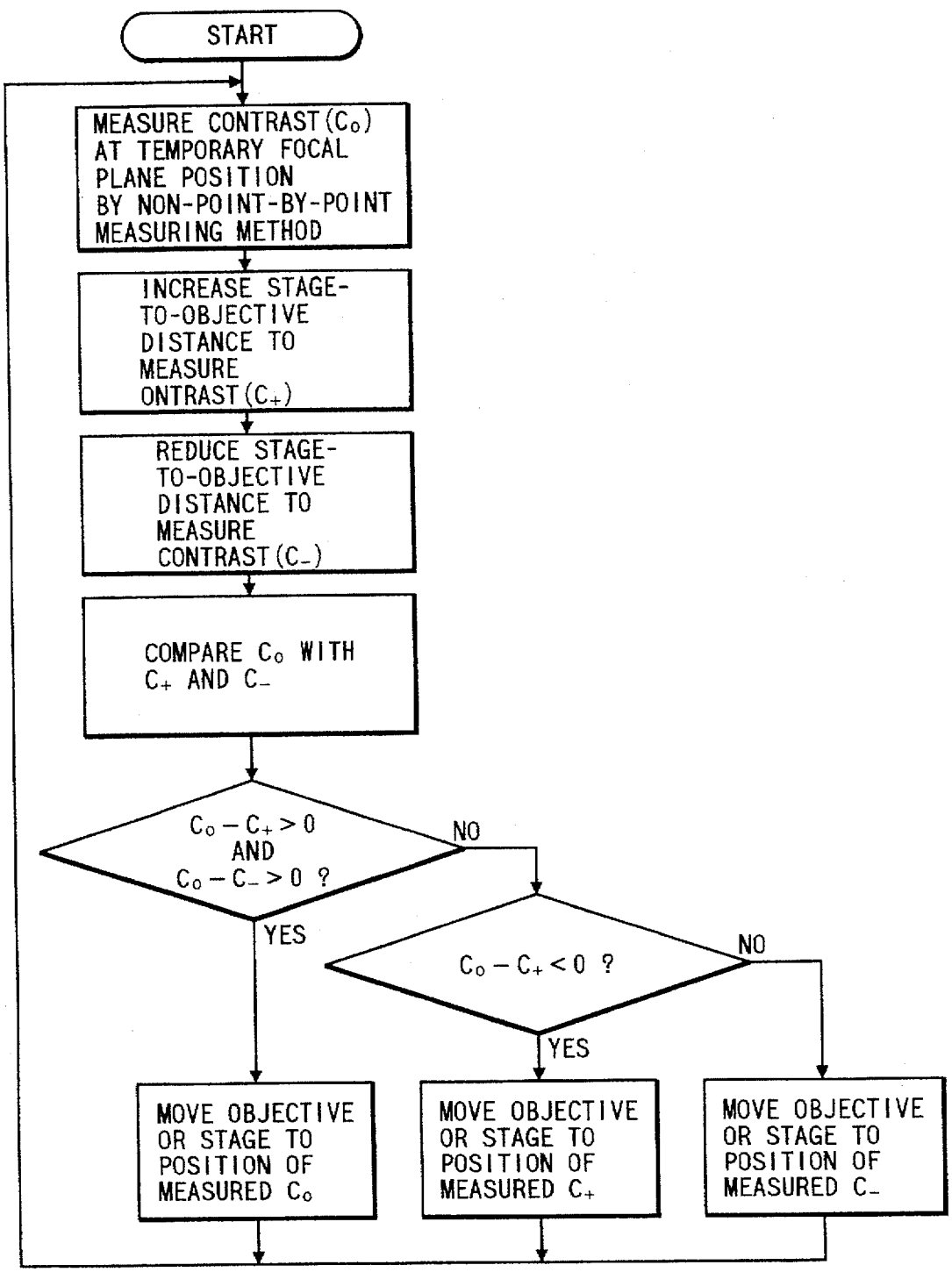
FIG. 10 is a flowchart showing the procedure of operation of the detection device of a fourth embodiment in the present invention.

The operation procedure of the fourth embodiment is shown in FIG. 10.

Fifth embodiment

Figure 5:
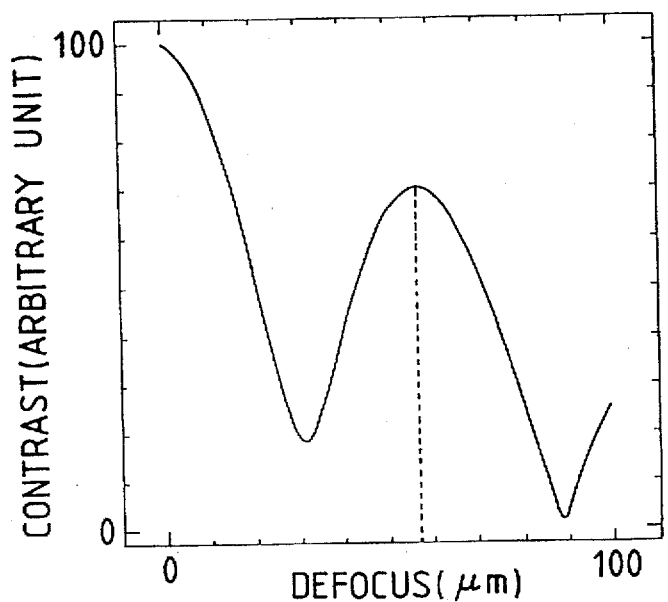
FIG. 5 is a graph showing defocus characteristics of the contrast of the detection device of the first embodiment.
Figure 8:
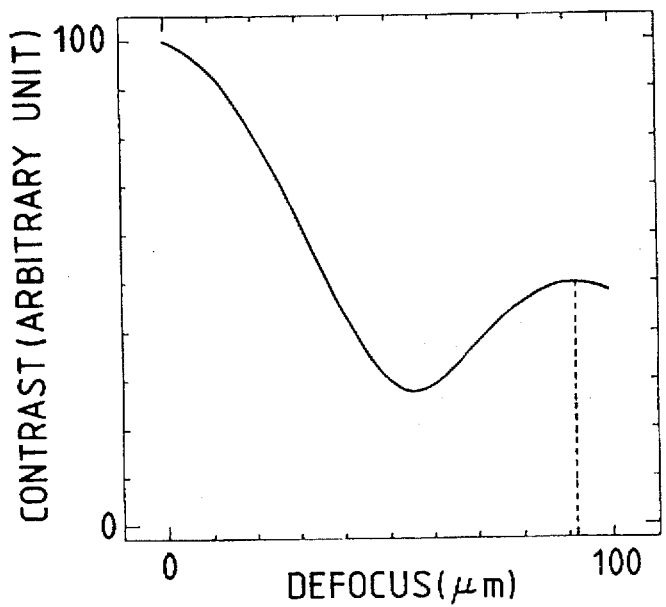
FIG. 8 is a graph showing defocus characteristics of the contrast of the detection device of a second embodiment in the present invention.
Figure 11:
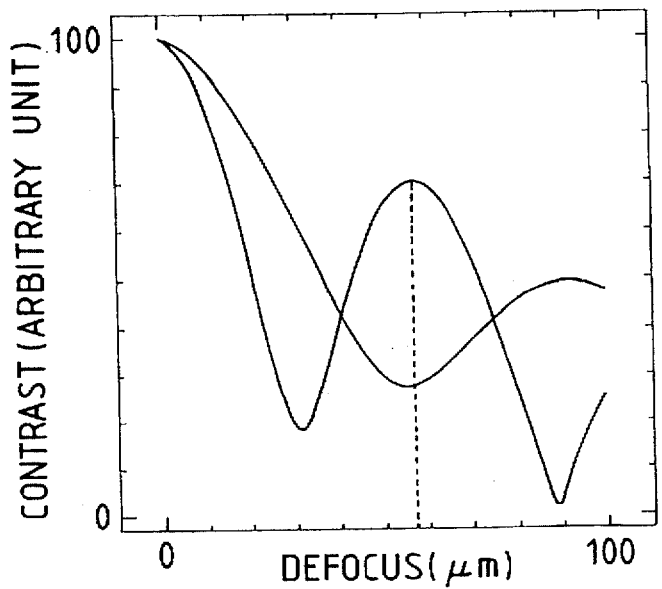
FIG. 11 is a graph showing defocus characteristics of the contrast of the detection device of a fifth embodiment in the present invention.

The automatic focus detection device according to this embodiment has the same construction as that of the first embodiment, but NA0/NA0B=0.54, NA1/NA0B=0.44, v0=72.7 lines/mm, and v1=43.6 lines/mm. Thus, the defocus characteristics of the contrast in this case, as plotted in FIG. 11, are such that two curves, shown in FIGS. 5 and 8, are drawn. When the distance d is taken as d=57 µm and the contrast is measured at a position shifted by the distance d from the temporary position of the focal plane found by the non-point-by-point measuring method, the position of the focal plane becomes false at the frequency v0 and the contrast is measured, but at the frequency v1, it is seen that the contrast is remarkably decreased. Thus, the contrast values C0 and C1 are first measured at the false position of the focal plane. This measuring way is the same as in the first embodiment. A change of the frequency to another can be realized by varying the number of pixel samplings and is made in the CPU/DATA STORAGE 19.

If C1−Δ>0, this position is decided as the position of the focal plane, and it is only necessary to move the stage or the objective lens to the position where the contrast C0 is measured. If, on the other hand, this condition is not satisfied, the stage or the objective lens is moved, by the adjusting means 20, to the position where the distance between the objective lens and the sample is increased by the same space as the distance between the position of the focal plane and the false position of the focal plane from the temporary position of the focal plane, and the value of the contrast C2 with the frequency v1 is measured. Here, the contrast values C0 and C2 are compared with each other in the CPU/DATA STORAGE 19. If C0−C2<0, the position where the contrast C2 is measured is decided as the position of the focal plane, and the stage or the objective lens is moved to this position. Conversely, if C0−C2>0, it is only necessary that a symmetrical position of the position where the contrast C2 is measured with respect to the temporary position of the focal plane is decided as the position of the focal plane, because the position where the contrast C2 is measured is not the position of the focal plane.

Figure 12:
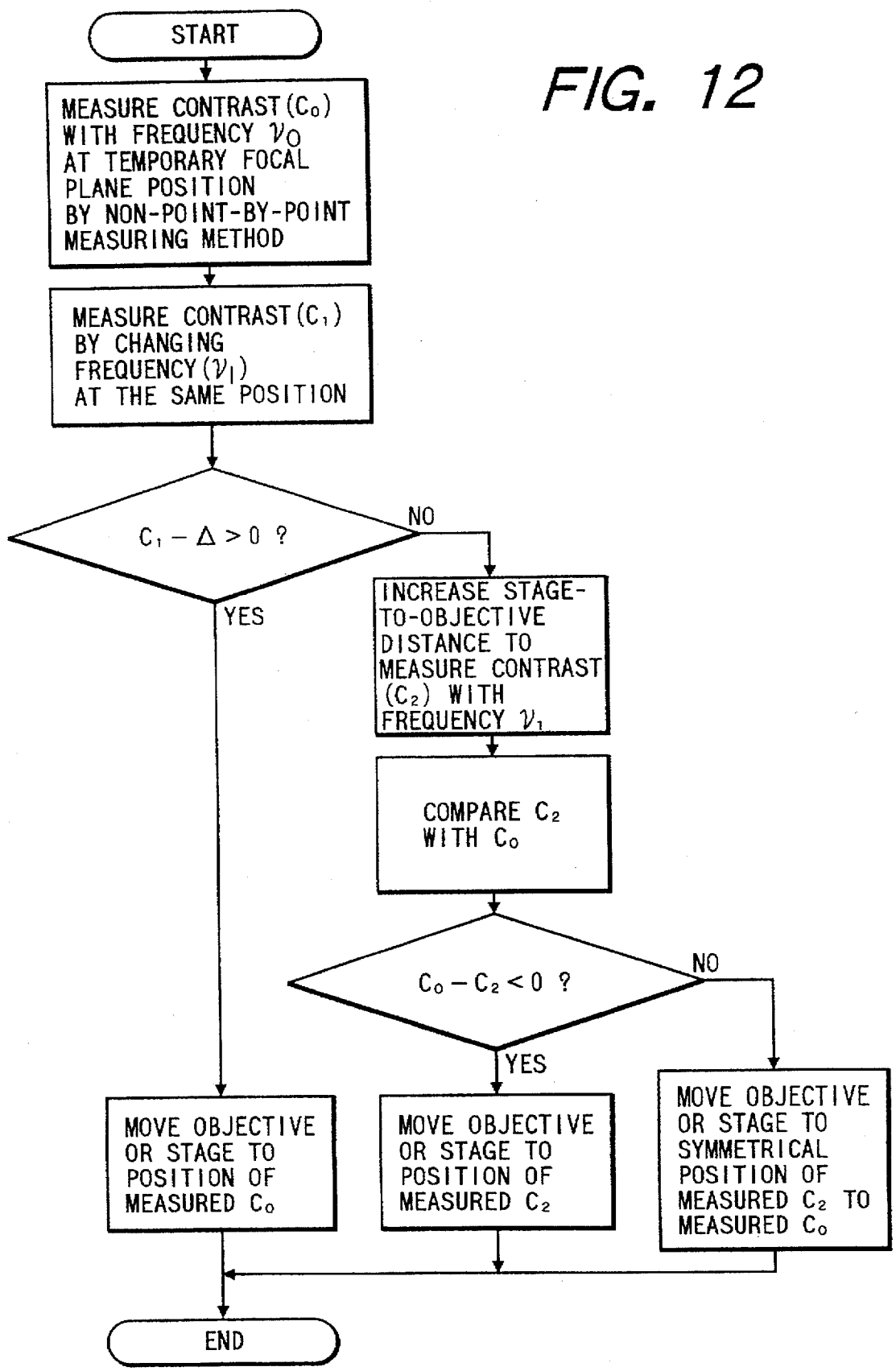
FIG. 12 is a flowchart showing the procedure of operation of the detection device of the fifth embodiment.

The operation procedure of the fifth embodiment is shown in FIG. 12.

Sixth embodiment

The construction of the automatic focus detection device according to this embodiment and its numerical apertures and frequencies are identical with those in the fifth embodiment. In the sixth embodiment, the position of the focal plane first detected is set as the initial position and the detection of the position of the focal plane is repeatedly performed so that a higher degree of accuracy of detection can be secured. That is, a feedback system is added to the operation procedure of the fifth embodiment.

Figure 13:
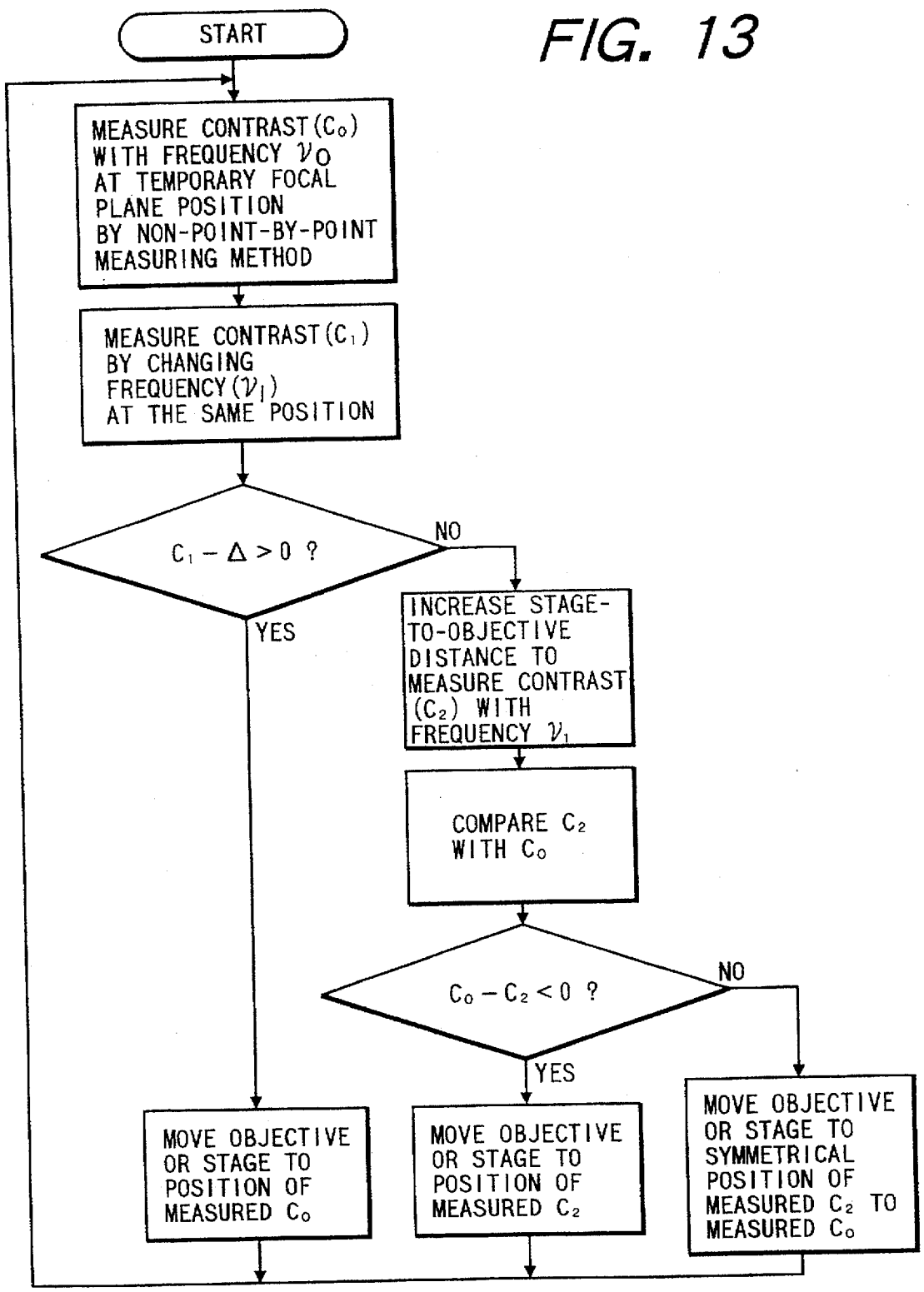
FIG. 13 is a flowchart showing the procedure of operation of the detection device of a sixth embodiment in the present invention.

The operation procedure of the sixth embodiment is shown in FIG. 13.

What is claimed is:

1. An automatic focus detection device for microscopes, comprising:

an optical system for forming an optical image of a sample to be observed, said optical system including:

a stage for holding the sample placed thereon, an objective lens, and an imaging lens; and an automatic focus detection section including:

an image sensor for photoelectrically converting the optical image derived from said optical system into an electric signal;

means for storing image data that is obtained by analog-to-digital conversion of the electric signal from said image sensor and for processing the image data to compute a contrast value, means for comparing contrast values, means for moving one of said objective lens and said stage, and means for storing a position of the one of said objective lens and said stage;

said automatic focus detecting section performing a focus detecting operation in such a manner that a first contrast value measured at a present position of the one of said objective lens and said stage is compared with a second contrast value previously measured where the one of said objective lens and said stage was located at a position shifted from the present position along an optical axis by a predetermined distance, a distance by which the one of said objective lens and said stage is to be moved next is determined from a contrast change obtained by comparison between the first and second contrast values, and if the distance required for next movement and a resultant contrast change predicted are below predetermined constant values, the present position of one of said objective lens and said stage is judged as an in-focus position, wherein said optical system further includes an illumination system with an annular aperture, and wherein said automatic focus detecting section proceeds to perform the focus detecting operation in such a manner that the position judged as the in-focus position is redefined as a temporary in-focus position, and the one of said objective lens and said stage is allowed to be moved, for contrast measurement from the temporary in-focus position by a space equal to a distance between a true in-focus position and a false in-focus position to change a distance between said objective lens and the sample, the distance between the true in-focus position and the false in-focus position being determined by a ratio of a numerical aperture corresponding to an inside diameter of a conjugate image of said annular aperture at a pupil position of said objective lens to a numerical aperture of said objective lens, a ratio of a numerical aperture corresponding to an outside diameter of the conjugate image of said annular aperture at the pupil position of said objective lens to the numerical aperture of said objective lens, and a first frequency which is determined by one value selected among a pixel size of said image sensor and integral multiples of the pixel size, so that a contrast measurement is made at least where the one of said objective lens and said stage is located at one place between the true in-focus position and the false in-focus position and then the true in-focus position is detected by comparison of contrast values.

2. An automatic focus detection device for microscopes according to claim 1, wherein the contrast measurement is made at least where the one of said objective lens and said stage is located at one position which is one of the true in-focus position and the false in-focus position based on at least two frequencies.

3. An automatic focus detection device for microscopes according to claim 1, wherein, where a contrast value obtained based on said first frequency when the one of said objective lens and said stage is located at the temporary in-focus position is represented by ($C_0$), a contrast value obtained based on said first frequency when the one of said objective lens and said stage is located at a position shifted from the temporary in-focus position by a space equal to the distance between the true in-focus position and the false in-focus position in a direction for increasing the distance between said objective lens and the sample is represented by ($C_+$), and a contrast value obtained based on said first frequency when the one of said objective lens and said stage is located at a position shifted from the temporary in-focus position by a space equal to the distance between the true in-focus position and the false in-focus position in a direction for decreasing the distance between said objective lens and the sample is represented by ($C_-$), if $$C_0 - C_+ > 0$$

and $C_0 - C_- > 0$, the temporary in-focus position is judged as the true in-focus position and the one of said objective lens and said stage is moved to the true in-focus position;

if $C_0 - C_+ < 0$, the position of the one of said objective lens and said stage where ($C_1$) is obtained is judged as the true in-focus position and the one of said objective lens and said stage is moved to the true in-focus position; and if $C_0 - C_- < 0$, the position of the one of said objective lens and said stage where ($C_-$) is obtained is judged as the true in-focus position and the one of said objective lens and said stage is moved to the true in-focus position.

4. An automatic focus detection device for microscopes according to claim 1, wherein, where a contrast value obtained based on said first frequency when the one of said objective lens and said stage is located at the temporary in-focus position is represented by ($C_0$), a contrast value obtained based on said first frequency when the one of said objective lens and said stage is located at a position shifted from the temporary in-focus position by a space equal to the distance between the true in-focus position and the false in-focus position is represented by ($C_2$), and a threshold value of contrast is represented by ($\Delta$), if $C_2 - \Delta < 0$, a position which forms symmetry with the position of the one of said objective lens and said stage where ($C_2$) is obtained with respect to the temporary in-focus position is judged as the true in-focus position and the one of said objective lens and said stage is moved to the true in-focus position;

if $C_2 - \Delta > 0$ and $C_0 - C_2 < 0$, the position of the one of said objective lens and said stage where ($C_2$) is obtained is judged as the true in-focus position and the one of said objective lens and said stage is moved to the true in-focus position; and if $C_2 - \Delta > 0$ and $C_0 - C_2 > 0$, the temporary in-focus position is judged as the true in-focus position and the one of said objective lens and said stage is moved to the true in-focus position.

5. An automatic focus detection device for microscopes according to claim 1, wherein the true in-focus position first detected is redefined as an initial position and a detection of the true in-focus position is repeatedly performed.

6. An automatic focus detection device for microscopes according to claim 2, wherein, where a contrast value obtained based on said first frequency when the one of said objective lens and said stage is located at the temporary in-focus position is represented by ($C_0$), a contrast value obtained based on a second frequency when the one of said objective lens and said stage is located at the temporary in-focus position is represented by ($C_1$), said second frequency being determined by another value selected among the pixel size of said image sensor and integral multiples of the pixel size, a contrast value obtained based on said second frequency when the one of said objective lens and said stage is located at a position shifted from the temporary in-focus position by a space equal to the distance between the true in-focus position and the false in-focus position is represented by ($C_2$), and a threshold value of contrast is represented by ($\Delta$), if $C_1 - \Delta > 0$, the temporary in-focus position is judged as the true in-focus position and the one of said objective lens and said stage is moved to the true in-focus position;

if $C_1 - \Delta < 0$ and $C_0 - C_2 < 0$, the position of the one of said objective lens and said stage where ($C_2$) is obtained is judged as the true in-focus position and the one of said objective lens and said stage is moved to the true in-focus position; and if $C_1 - \Delta < 0$ and $C_0 - C_2 > 0$, a position which forms symmetry with the position of the one of said objective lens and said stage where ($C_2$) is obtained with respect to the temporary in-focus position is judged as the true in-focus position and the one of said objective lens and said stage is moved to the true in-focus position.

7. An automatic focus detection device for microscopes according to claim 2, wherein the true in-focus position first detected is redefined as an initial position and a detection of the true in-focus position is repeatedly performed.

* * * * *